Patented Nov. 7, 1933

1,933,939

UNITED STATES PATENT OFFICE 1,933,939

PREPARATION OF FENCHONE

Lee T. Smith, Madison, N. J., assignor to Hercules Powder Company, Wilmington, Del., a corporation of Delaware No Drawing. Application May 24, 1930
Serial No. 455,463

10 Claims. (Cl. 260—132)

This invention relates to the preparation of fenchone by the dehydrogenation of fenchyl alcohol; and specifically relates to a catalytic process whereby hydrogen is split from the secondary alcohol to give the ketone in accordance with the equation:

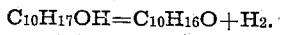
$$C_{10}H_{17}OH = C_{10}H_{16}O + H_2.$$

The process forming the subject matter of this invention gives large yields of the ketone when carried out as either a batch process or as a continuous process. In both cases it involves the treatment of fenchyl alcohol with a metallic catalyst at elevated temperatures, the fenchyl alcohol being, in the batch process, either in a pure state or in solution in an inert solvent, and the catalyst being preferably carried by an inert porous carrier so as to offer a large contact surface.

In order to render clear the mode of carrying out the invention, there will first be specifically described in detail batch and continuous processes in accordance therewith, and thereafter, the numerous possible variations will be discussed.

In a preferred batch process, the catalyst was first prepared as follows:

164 parts of copper nitrate, 74 parts of manganese nitrate, and 6 parts of magnesium acetate (each containing its normal water of crystallization) were dissolved in 100 parts of water. To this were added 50 parts of 80 mesh (or finer) pumice stone. The mixture was then thoroughly agitated to suspend the pumice in the solution and an aqueous alkaline solution (containing either alkali hydroxides or carbonates) was added until the metals were precipitated. The precipitate containing the hydroxides or carbonates of the metals and the pumice in thorough admixture was washed until free of excess alkali, filtered, and dried at 110° C. for 12 hours, and then finely pulverized.

2.5 parts of the above dried and pulverized catalyst were then placed in a vessel and heated upon an oil bath to about 225° C. while methanol vapors were passed through the vessel for four hours to effect complete reduction of any reducible carbonate, hydroxide, or oxide to metal. It will be understood, of course, that while the copper derivative would be reduced to the metallic state, the manganese and magnesium would remain as oxidized derivatives.

50 parts of technical fenchyl alcohol (95% fenchyl alcohol) and 100 parts of paraffin wax were poured upon the reduced catalyst while preventing access of air. The mixture was then heated at a temperature of 225° C. for a period of 8 hours, during which time the contents of the reaction vessel were agitated, the alcohol being retained in the reaction vessel by the use of a reflux condenser. As the dehydrogenation proceeded, hydrogen was evolved. The product, fenchone, was recovered by steam distillation followed by fractionation, the yield being 92%. Evolved hydrogen may be used for reduction of metal catalyst.

It is found that the dehydrogenation may be effected at temperatures as low as 180° although the process requires a longer period for completion. While an inert solvent, in the illustration, paraffin, is preferably used, particularly at low temperatures, the dehydrogenation may be carried out under pressure at temperatures of 225° C.–325 C. in the absence of any solvent.

In one very satisfactory continuous method, 30 parts of the above prepared catalyst were placed in a glass tube along with asbestos fibre to increase the porosity and thereby cut down the resistance to the flow of gases and vapors. Reduction of the catalyst was effected by passing hydrogen through the tube for 8 hours while maintaining the catalyst at a temperature of 300° C. Fenchyl alcohol vapors were then passed through the tube while maintaining the catalyst at 300° C.–330° C. The vapors may, for example, be fed at the rate of about 9.4 parts per hour for 31½ hours. The yield of fenchone ranged from 92%–97% at different periods, the higher yields occurring during the later periods of the run. It was found that the activity of the catalyst did not decrease even after 72 hours of continuous use.

In other variations of the continuous process it was found that dehydrogenation temperature could vary from about 200° C.–425° C. depending upon the activity of the catalyst, rate of flow of the alcohol, etc.

In the above processes very little dehydration of fenchyl alcohol to fenchone occurred.

The considerable variations of temperature, pressure and other conditions which may take place in carrying out the process have been referred to above. It is found, furthermore, that equally good results are obtained by the use of catalysts other than that specifically referred to, the other conditions of the reaction remaining substantially the same.

Of metals used alone as catalysts, nickel was found to be most active. But even more active than nickel alone, are various mixtures of metals with other metals or oxy-derivatives thereof in cases where such derivatives are irreducible by hydrogen or methanol or similar agents. For example, the activity of nickel is greatly increased by the presence of copper to the extent of about 10% of the mixed copper and nickel. The activity of the catalysts is further markedly increased by suspending them upon porous carriers such as kieselguhr, pumice, dehydrated silica gel, or asbestos. The use of a carrier will reduce the amount of catalyst used in a batch process in an amount of the order of 11% to 4% necessary to obtain practically quantitative yields of fenchone. Catalysts containing metals and carriers in the following proportions were found to produce very good results:

| A | B | C | D |
|---|---|---|---|
| Mn—7<br>Mg—1<br>Cu—42<br>Pumice—50 | Mg—14<br>Cu—2<br>Pumice—84 | Cu—4<br>Ni—38<br>Mn—7<br>Mg—1<br>Pumice—50 | Cu—42<br>Mn—7<br>Zn—1<br>Pumice—50 |

| E | F | G | H |
|---|---|---|---|
| Ni—58.5<br>Cu—6.5<br>SiO$_2$—35.0 | Ni—58.5<br>Cu—6.5<br>Pumice—35 | Ni—58.5<br>Cu—6.5<br>Kieselguhr—35 | Ni—52.0<br>Cu—13<br>Pumice—35 |

It is found that the nickel in the above examples may be replaced by manganese or magnesium. The catalysts containing three metallic components are somewhat more active than those containing only two components; for example, the addition of a small amount of zinc to a copper-manganese catalyst is helpful. Again, a combination of nickel, manganese, and magnesium which is inactive becomes quite active upon the addition of copper. The percentage compositions of the catalysts need not be rigidly adhered to since they may be varied considerably and yet produce active catalysis.

The catalysts are best prepared, as in the example given above, by the precipitation of the oxides, hydroxides or carbonates of the metals in the presence of finely divided carriers which should be of a fineness of 80 mesh or smaller. The reduction of the catalyst is effected either by hydrogen or any of the well known organic reducing agents of which the lower aliphatic alcohols, such as methanol, are readily available and satisfactory examples.

The quantity of catalyst needed may be reduced by covering it with a film of mineral oil so that exposure to air may take place without oxidation, the reduced metal being protected by a film of the oil. Catalysts thus protected remain active even though exposed to air for prolonged periods.

It will be understood that the several catalysts illustrated herein may be supported in various substances, as kieselguhr, silica, pumice, and the like.

What I claim and desire to protect by Letters Patent is:

1. A process of producing fenchone by the dehydrogenation of fenchyl alcohol involving the treatment, with heat at an elevated temperature and in the absence of oxygen, of the alcohol with a metallic catalyst capable of effecting the dehydrogenation and including at least two metals.

2. A process of producing fenchone by the dehydrogenation of fenchyl alcohol involving the treatment, with heat at an elevated temperature and in the absence of oxygen, of the alcohol with a metallic catalyst capable of effecting the dehydrogenation and including at least two metals, one of which is copper.

3. A process of producing fenchone by the dehydrogenation of fenchyl alcohol involving the treatment, with heat at an elevated temperature and in the absence of oxygen, of the alcohol with a metallic catalyst capable of effecting the dehydrogenation and including at least two metals, at least one of which has an atomic weight between 53 and 66.

4. A process of producing fenchone by the dehydrogenation of fenchyl alcohol involving the treatment, with heat at an elevated temperature and in the absence of oxygen, of the alcohol with a metallic catalyst capable of effecting the dehydrogenation and including at least two metals having atomic weights between 53 and 66.

5. A process of producing fenchone by the dehydrogenation of fenchyl alcohol involving the treatment, with heat at an elevated temperature and in the absence of oxygen, of the alcohol with a metallic catalyst capable of effecting the dehydrogenation and including at least two metals carried by a porous carrier.

6. A process of producing fenchone by the dehydrogenation of fenchyl alcohol involving the treatment, with heat at an elevated temperature and in the absence of oxygen, of the alcohol with a metallic catalyst capable of effecting the dehydrogenation and including a metal in the metallic state and an oxide of another metal.

7. A process of producing fenchone by the dehydrogenation of fenchyl alcohol involving the treatment, with heat at an elevated temperature and in the absence of oxygen, of the alcohol with a metallic catalyst capable of effecting the dehydrogenation and including a metal in the metallic state produced by the reduction of an oxy-compound thereof on the carrier and an oxide of another metal.

8. A process of producing fenchone by the dehydrogenation of fenchyl alcohol involving the treatment with heat at an elevated temperature and in the absence of oxygen, of the alcohol, with a metallic catalyst capable of effecting the dehydrogenation and including at least two metals, at least one of which is copper and another of which has an atomic weight between 53 and 66.

9. A process of producing fenchone by the dehydrogenation of fenchyl alcohol involving the treatment with heat at an elevated temperature and in the absence of oxygen, of the alcohol with a metallic catalyst capable of effecting the dehydrogenation and including metallic copper and an oxide of another metal.

10. A process of producing fenchone by the dehydrogenation of fenchyl alcohol, involving the treatment with heat, at an elevated temperature and in the absence of air, of the alcohol with a metallic catalyst including copper and nickel.

LEE T. SMITH.